W. T. MERRITT.
Automatic Gate.
No. 10,199. Patented Nov. 1, 1853.
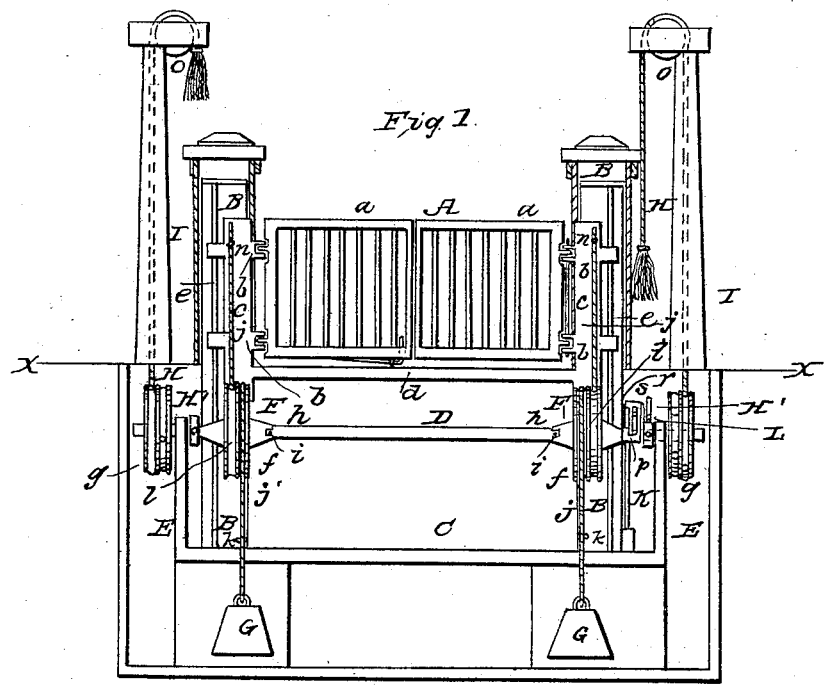
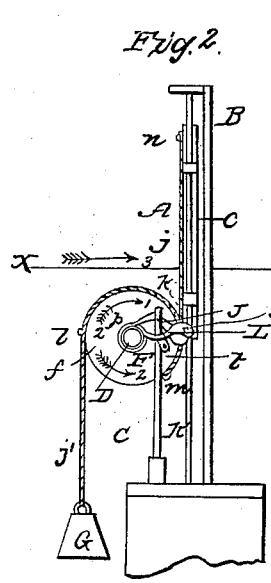
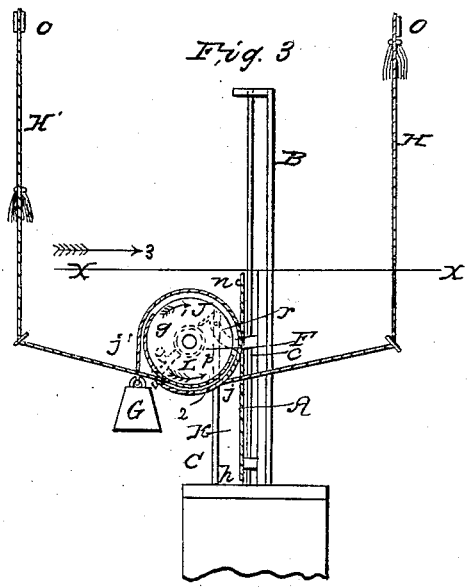

UNITED STATES PATENT OFFICE.

WILLIAM T. MERRITT, OF HARTS VILLAGE, NEW YORK.

MODE OF OPENING AND CLOSING GATES.

Specification of Letters Patent No. 10,199, dated November 1, 1853.

*To all whom it may concern:*

Be it known that I, WILLIAM T. MERRITT, of Harts Village, in the county of Dutchess and State of New York, have invented a new and Improved Mode of Operating Gates, Whereby a Gate may be Opened and Closed by a Driver Without Leaving His Seat; and I do hereby declare that the following is a full, clear, and exact description of the same, reference being had to the accompanying drawings, making a part of this specification, in which—

Figure 1, is a front view of a gate, with my improvement applied to it. In this view the gate is elevated or closed. Fig. 2, is a side view of the same; the gate being elevated or closed; and the operating pulley nearest the eye being removed. This view is designed to show the dog, which prevents the gate from descending by any extraneous cause. Fig. 3, is also a side view of the gate; the gate being down or open. In this view, the one operating pulley is seen, with its ropes or chains.

Similar letters of reference indicate corresponding parts, in each of the several figures.

This invention relates to a new and improved mode of operating a gate, or raising and depressing it, so that it may be opened or closed by a driver without leaving his seat. The above operation is effected by means of pulleys, chains, and weights, arranged as will be hereafter shown, and using in connection therewith, a dog, peculiarly arranged, for preventing any casual movement of the gate.

To enable others skilled in the art to make and use my invention, I will proceed to describe the construction and operation of the same.

A, represents the gate, consisting of two parts, (a), (a), each part being hung by hinges, (b), (b), to posts or stiles, (c), (c), connected at their lower ends by a cross-piece, (d), as shown in Fig. 1. The posts or stiles (c), (c), work upon guides or ways, (e), (e), which are secured, vertically to standards, B, B. The standards, B, B, pass downward a suitable distance below the surface of the ground which is shown by the line, X, X; a recess or chamber, C, being dug in the ground to receive the said standards, and also the device by which the gate is operated.

D, is a horizontal shaft, placed within the chamber or recess, C, at a short distance below the surface of the ground. This shaft runs in suitable bearings upon the supports, E, E, shown in Fig. 1, but omitted in Figs. 2, and 3. Upon the shaft, D, are placed four double grooved pulleys, $(f)$, $(f)$, $(g)$, $(g)$; all of these pulleys are shown in Fig. 1; one pulley, $(f)$, in Fig. 2; and two of the pulleys—one, $(f)$, and one, $(g)$,—are seen in Fig. 3. The pulleys, $(f)$, $(f)$, are placed loosely on the shaft, D, and pins, $(h)$, $(h)$, attached to the shaft D, fit in recesses, $(i)$, $(i)$, of a suitable width, cut in the bosses or hubs, F, F, of the pulleys, $(f)$, $(f)$, as shown in Fig. 1. The pulleys, $(g)$, $(g)$, I term, "operating pulleys"; they are attached permanently to the shaft D.

Two chains, $(j)$, $(j')$, are attached to the periphery of each pulley, $(f)$, and to the gate posts or stiles, $(c)$, $(c)$. The chains, $(j')$, $(j')$, have weights, G, G, at one end; and the opposite ends are attached to the lower ends of the posts or stiles, $(c)$, $(c)$, as shown at $(k)$, in Figs. 1, 2, and 3; the chains $(j')$, being secured to the peripheries of the pulleys, $(f)$, at points, $(l)$, seen in Figs. 1, and 2. The chains $(j)$, are secured at one end to the peripheries of the pulleys, $(f)$, at points, $(m)$, seen in Figs. 2, and 3, and the opposite ends of the chains, $(j)$, are secured to the upper ends of the posts or stiles, at points, $(n)$, seen in Figs. 1, 2 and 3.

The operating pulleys, $(g)$, $(g)$, have each two ropes, H, H', attached to their peripheries at opposite points, seen in Figs. 1, and 3. These ropes pass over small pulleys, $(o)$, on the upper ends of uprights, I. These uprights are seen in Fig. 1, but are omitted in the remaining two figures. There are two uprights on each side of the gate; one to each pulley on each side; making, in all, four uprights.

On the hub or boss, F, of one of the pulleys, $(f)$, there is a small recess or notch, $(p)$, seen in Figs. 1, and 2, and also dotted lines in Fig. 3. In this notch or recess, $(p)$, a pawl, J, fits, when the gate is elevated or closed, as shown in Figs. 1, and 2. The pawl, J, works on a pivot, $(r)$, which passes through a standard, K.

On the shaft, D, and adjoining the standard, K, there is a dog, L, more particularly shown in Fig. 2, and by dotted lines in Fig. 3.

On the outer end of the dog, L, there is a pin, $(s)$, which passes through the dog, and over the outer end of the pawl, J.

The several parts being now described, I will proceed to describe the operation:— Suppose the gate to be elevated or closed, as shown in Fig. 1; and the dog, J, in the notch or recess, (p), in the hub or boss, F. It will be seen that the gate cannot be depressed by any extraneous cause; for instance, by cattle working at it; for the pawl, J, must first be freed from the notch, (p), in order to allow the shaft, D, and pulleys, (f), (f), to which the gate is attached by the chains, (j), (j'), to turn. The driver, when within reach of the end of the cord, H', at his right hand, draws it downward; (suppose the vehicle to be going in the direction indicated by the arrow 3, in Figs. 2, and 3;) this movement of the cord, H', causes the pulleys, (g), (g), (f), (f), and shaft, D, to turn in the direction indicated by arrow, 1, seen in Figs. 2, and, 3; and consequently the chains, (j), (j) which are attached to the pulleys, (f), (f), and to the upper parts of the posts or stiles, (c), (c), as shown at, (n), draw the gate downward within the chamber, C; the weights, G, G, being raised in consequence of the chains, (j'), (j'), being drawn around the pulleys, (f), (f), see Fig. 3. When the driver has passed through the gate, he draws downward the rope H, and the pulleys, (f), (f), (g), (g), and shaft, D, will turn in an opposite direction indicated by arrow 2, in Figs. 2, and 3; and the chains, (j'), (j'), which are attached to the lower ends of the posts or stiles, (c), (c), as shown at, (k), Figs. 1, 2, and 3, will draw the gate upward, and close it; the weights G, G, serving to counterpoise the gate. As there are four uprights, I, in all, it will be seen that the driver operates the right-hand cords, in passing through the gate, in either direction.

It has been stated that the gate could not be depressed, without first moving the pawl, J, from the recess or notch, (p), in the hub or boss, F. This pawl is forced from the notch, (p), by means of the dog, L; the pin, (s), of said dog, bears down on the outer end of the pawl, J, and raises the inner end from the notch, as the shaft, D, is turned. The pulleys, (f), (f), being placed loosely on the shaft, D, remain stationary, until the pins, (h), (h), come in contact with the edges of the recesses, (i), (i), in the bosses or hubs; and when the pins, (h), (h), commence to act upon or turn the shaft, D, the pawl is freed from the notch.

When the gate is elevated or closed, the dog, of course, is turned in a contrary direction; and a pin, (t), on a lower prong of the dog, throws the pawl back into its original position in the notch.

The chamber, C, is covered at the top; a space for the gate to work through, being allowed.

If any derangement of the working parts should occur, the gate may be opened and closed, in the ordinary way; as it is hung upon hinges, (b), in the usual manner.

Having thus described my invention, what I claim as new, and desire to secure by Letters-Patent, is,—

The method of elevating or depressing, or opening and closing, the gate, as herein shown and described, viz., by means of the shaft, D, having upon it the pulleys, (f), (f), (g), (g); the pulleys, (g), (g), being attached permanently to said shaft, and having ropes, H, H', attached to them; and the pulleys, (f), (f), being placed loosely on the shaft, and connected to it at a certain period by means of pins, (h), (h), on the shaft working in slots, (i), (i), in the bosses or hubs of the pulleys, (f), (f); the said pulleys, (f), (f), having the chains, (j), (j), attached to them, and to the upper ends of the gate-stiles, (c), (c), and also the chains, (j'), (j'), with the weights, G, G; the said chains, (j'), (j'), being attached to the lower ends of the stiles, (c), (c); the gate being prevented from being casually depressed or opened, by means of the pawl, J, which is freed from the notch, (p), in the boss or hub, by the dog, L, substantially as set forth.

WM. T. MERRITT.

Witnesses:
  O. D. MUNN,
  H. COHEN.